United States Patent Office 3,353,965
Patented Nov. 21, 1967

3,353,965
TOPPING COMPOSITION
Bernard A. Patterson, 4040 N. Le Claire,
Chicago, Ill. 60640
No Drawing. Filed Feb. 4, 1964, Ser. No. 342,555
9 Claims. (Cl. 99—139)

ABSTRACT OF THE DISCLOSURE

High fat emulsion which is stable after freezing and thawing comprising a thoroughly blended mixture of an edible vegetable glyceride fat, sugar, a non-toxic, non-ionic surface active emulsifying agent, water, and stearyl monoglyceridyl citrate as a stabilizer.

---

The present invention relates to an improved food product and to a method of making the same, and, more specifically, to a whippable high fat emulsion suitable as a topping for salads and desserts.

The present invention provides an improved whippable composition containing an edible vegetable glyceride fat in combination with invert sugar, at least one non-toxic, non-ionic surface active emulsifying agent, and the compound stearyl monoglyceridyl citrate, in correct proportions, and processed under suitable conditions to provide an extraordinarily stable whipped product. Heretofore, one of the big drawbacks of synthetic whips of this type has been the inability of the material to prevent separation or aggregation of fats after freezing and thawing. Another type of limitation existed at high temperatures, as heretofore it was impossible to produce a sterile product because at temperatures substantially above 200° F., most high fat emulsions broke down and could not be rehomogenized.

The composition of the present invention improves the stability of whippable vegetable fat emulsions at both ends of the temperature scale, by providing an emulsion which can be frozen and thawed without separation occurring, and which also can be rehomogenized after heating to temperatures on the order of 300° F., thereby making it possible to package a sterile product.

One of the objects of the present invention is to provide an improved high fat emulsion composition capable of being whipped into a rigid foam which maintains its consistency longer than similar products presently available.

Another object of the present invention is to provide an improved high fat emulsion composition capable of being thawed from below the freezing point to above freezing temperatures without breaking the emulsion.

Still another object of the invention is to provide a liquid emulsion which can withstand temperatures above 200° F., thereby permitting the emulsion to be packaged in a sterile manner.

A further object of the invention is to provide an improved method for the manufacture of stable edible emulsions capable of being whipped into a rigid foam.

The present invention is useful in conjunction with any edible vegetable glyceride fat, although with varying degrees of success. I particularly prefer to employ either hydrogenated coconut oil, or palm oils, or mixtures of the two. Some domestic oils can be tolerated in the composition, such as cottonseed oil, but I prefer to limit the use of such oils to about 2% or so.

The invert sugar used in accordance with the present invention is a commercially available composition which results from the hydrolysis of sucrose with acids or the enzyme invertase to yield D-glucose and D-fructose in equal amounts. I believe that the use of this invert sugar in place of other types of sugars substantially contributes to the ability of the resulting emulsion to resist low temperatures.

The emulsifying agent should be of the type which is non-toxic and non-ionic. Very suitable materials are the normally long chain fatty acid esters of polyhydric alcohols, the ester group containing between about 10 and 24 carbon atoms per molecule. Particularly good results are obtained in the practice of my invention through the use of a combination of two non-ionic materials, consisting of a mixture containing polyoxyethylene glycol monostearate and 35% sorbitan monostearate. However, other materials can be used including polyoxyethylene derivatives of fatty acid partial esters of hexitol anhydrides, and polyoxyethylene derivatives of other fat forming fatty acids.

Much of the improvement in the composition of the present invention is attributable to the presence of the compound stearyl monoglyceridyl citrate. This material is an emulsion stabilizer which is completely miscible with all vegetable fats and oils. It has an acid number of about 40 to 52, a saponification number of 215 to 255, and a citric acid content of 15 to 18%. This material substantially improves the stability of the emulsion at high temperatures, and, when combined with the particular non-ionic emulsifying agents specified herein, permits the material to withstand lower temperatures, thereby allowing for more fluidity in packaging. It also helps prevent the aggregation of fats when the emulsion is subject to rapid changes from cold to high temperatures during storage of the finished emulsion. It has also made it possible to stabilize the emulsion which has been frozen at 32° F. or so, thus allowing for reheating of the emulsion at temperatures above freezing without a breakdown of the emulsion. In this respect it cooperates with the invert sugar previously described in achieving a characteristic previously unmatched in compositions of this type.

The composition of the present invention can also include other additives which are commonly employed in whippable emulsions. For example, a small amount of salt can be added for flavor. While proteinaceous materials are not essential to the composition of the present invention they can be used to advantage as bodying agents. Sodium caseinate, soy protein, and denatured collagen can be used for this purpose.

The ranges of ingredients for the composition of the present invention are given below:

Table I

| | Percent by weight |
|---|---|
| Non-ionic surfactant | 0.40 to 2 |
| Vegetable fat | 20 to 30 |
| Proteinaceous material | 0.10 to 1 |
| Stearyl monoglyceridyl citrate | 0.20 to 0.90 |
| Salt | 0.20 to 0.50 |
| Invert sugar (as standard 72% solids in water) | 6 to 12 |
| Flavor and color | As desired |
| Water | Balance |

It is important that the ingredients be blended properly if the best results are to be obtained from the practice of this invention. In the manufacture of the frozen emulsion, for example, the first step is to blend the dry solids and the water at temperatures below 180° F. Then, in separate vats, the stearyl monoglyceridyl citrate, the fats, and the surfactants are melted, while maintaining temperatures of about 120 to 160° F. The fat emulsion is then combined with the previously prepared blend in a vat for 5 to 15 minutes at temperatures not exceeding about 160° F. The combined blends are then put through a homogenizer (for example, of the ram type) in a first stage operating at a pressure on the order of 1500 p.s.i. and then through a second stage operating at a pressure on the order of 500 p.s.i. Finally, the homogenized liquids are chilled to a temperature of about 60° F. whereupon they are placed in storage containers and immediately frozen below 32° F.

In the manufacture of the sterile material, the dry solids in the water are blended, again at temperatures not in excess of 180° F. The stearyl monoglyceridyl citrate, the fats, and the surfactants are then melted and combined at temperatures of 120 to 160° F. The combined blends are then homogenized in two stages, the first at a pressure of about 1000 p.s.i. and the second at a pressure of about 500 p.s.i. Then, the homogenized mixture is heated and flash sterilized while at a temperature of about 300° F., followed by rehomogenization at pressures ranging from 500 to 1500 pounds per square inch, after the mixture has been cooled to 120° F. Then, the temperature of the final product is reduced to 50° F. before covering in the container.

A frozen emulsion was made up using ingredients as specified in the ranges of Table I. The non-ionic surfactants consisted of 65% by weight of polyoxyethylene glycol monostearate and 35% by weight of sorbitan monostearate. The vegetable fat was a hydrogenated coconut oil, and the proteinaceous material consisted of sodium caseinate. When following the procedure previously recited for frozen emulsions, a product was produced which was completely stable to changes in temperature, and could be frozen and thawed out without separation of fats. The materials could be speedily whipped to a desired rigidity, while trapping as much as 300% air.

Similarly, when following the procedure set forth for the sterile mix, the materials produced which could be asceptically sterilized, and then canned and maintained at room temperatures of 60 to 100° F. without breakdown of the fat contained therein.

It should be evident that various modifications can be made to the described embodiments without departing from the scope of the present invention.

I claim as my invention:

1. A high fat emulsion composition capable of being whipped into a rigid foam, and being capable of being thawed from below the freezing point to above freezing temperatures without breaking the emulsion which comprises a thoroughly blended mixture of an edible vegetable glyceride fat, a proteinaceous bodying agent, invert sugar, a non-toxic, non-ionic surface active emulsifying agent, water, and stearyl monoglyceridyl citrate in an amount sufficient to stabilize the emulsion.

2. A high fat emulsion composition capable of being whipped into a rigid foam, and being capable of being thawed from below the freezing point to above freezing temperatures without breaking the emulsion which comprises a thoroughly blended mixture of an edible vegetable fat selected from the group consisting of hydrogenated coconut oils, palm oils, and mixtures of the two, a proteinaceous bodying agent, invert sugar, a non-toxic, non-ionic surface active emulsifying agent, water, and stearyl monoglyceridyl citrate in an amount sufficient to stabilize the emulsion.

3. A high fat emulsion composition capable of being whipped into a rigid foam, and being capable of being thawed from below the freezing point to above freezing temperatures without breaking the emulsion which comprises a thoroughly blended mixture of from 20 to 30% by weight of an edible vegetable glyceride fat, from 0.1 to 1% of a proteinaceous bodying agent, from 6 to 12% of an invert sugar solution containing about 72% solids, from 0.40 to 2% of an edible non-ionic surface active emulsifying agent, from 0.20 to 0.90% stearyl monoglyceridyl citrate, and the balance substantially water.

4. A high fat emulsion composition capable of being whipped into a rigid foam, and being capable of being thawed from below the freezing point to above freezing temperatures without breaking the emulsion which comprises a thoroughly blended mixture of from 20 to 30% by weight of an edible vegetable glyceride fat selected from the group consisting of hydrogenated coconut oils, palm oils, and mixtures of the two, from 0.1 to 1% of a proteinaceous bodying agent from 6 to 12% of an invert sugar solution containing 72% solids, from 0.40 to 2% of an edible non-ionic surface active emulsifying agent, from 0.20 to 0.90% stearyl monoglyceridyl citrate, and the balance substantially water.

5. The composition of claim 3 in which said emulsifying agent consists of a mixture of polyoxyethylene glycol monostearate and sorbitan monostearate.

6. A high fat emulsion composition capable of being whipped into a rigid foam, and being capable of being thawed from below the freezing point to above freezing temperatures without breaking the emulsion which comprises a thoroughly blended mixture of from 20 to 30% by weight of an edible vegetable glyceride fat, from 6 to 12% of an invert sugar solution containing 72% solids, 0.40 to 2% of an edible non-ionic surface active emulsifying agent, from 0.10 to 1% sodium caseinate, from 0.20 to 0.90% stearyl monoglyceridyl citrate, and the balance substantially water.

7. The method of making a whippable emulsion which comprises blending the solids which are to appear in the emulsion and water at a temperature not exceeding 180° F., separately blending an edible vegetable glyceride fat, a proteinaceous bodying agent a non-toxic, non-ionic surface active emulsifying agent and stearyl monoglyceridyl citrate in liquid form at a temperature of from 120 to 160° F., mixing the two blends together, homogenizing the resulting combined blends at a pressure on the order of 1500 p.s.i., thereafter homogenizing the blends at a pressure on the order of 500 p.s.i., and thereafter freezing the homogenized blends.

8. The method of making a sterile whippable emulsion which comprises blending the solids which are to appear in the emulsion and water at a temperature not exceeding 180° F., separately blending an edible vegetable glyceride fat, a proteinaceous bodying agent a non-toxic, non-ionic surface active emulsifying agent and stearyl monoglyceridyl citrate in liquid form, mixing the blends together, homogenizing the resulting mixture at a pressure on the order of 1000 p.s.i., thereafter homogenizing the mixture at a pressure on the order of 500 p.s.i., flash sterilizing the mixture at about 300° F., rehomogenizing said mixture after such sterilizing at pressures of 500 to 1500 p.s.i., and thereafter cooling the mixture.

9. The method of claim 7 in which the combined blends contain from 20 to 30% by weight of an edible vegetable glyceride fat, from 0.1 to 1% of a proteinaceous bodying agent, from 6 to 12% of an invert sugar solution containing 72% solids, from 0.40 to 2% of an edible non-ionic surface active emulsifying agent, from 0.20 to 0.90% stearyl monoglyceridyl citrate, and the balance substantially water.

References Cited

UNITED STATES PATENTS 3,145,109　8/1964　Howard _____ 99—118
3,210,198　10/1965　Keller _____ 99—139

A. LOUIS MONACELL, *Primary Examiner.*

J. M. HUNTER, *Assistant Examiner.*